Dec. 30, 1930.  F. J. MacDONALD  1,786,542
MACHINE FOR CUTTING ARTICLES FROM SHEET MATERIAL
Filed Sept. 17, 1928    5 Sheets-Sheet 4
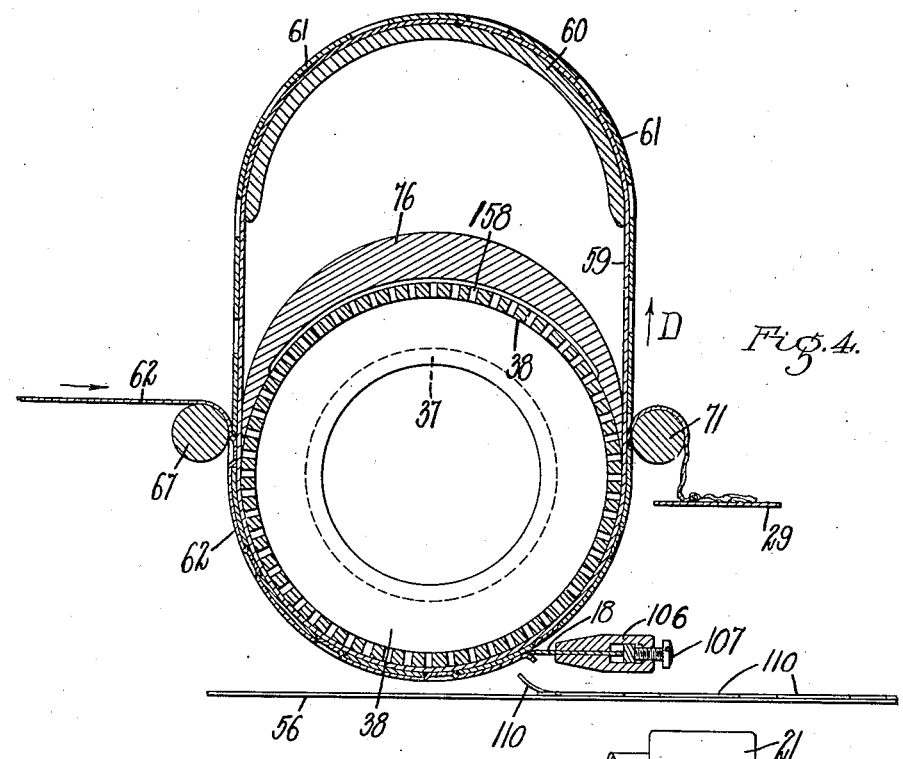
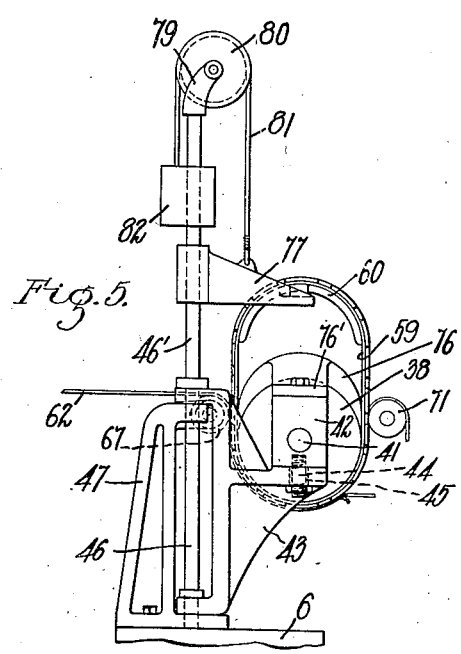
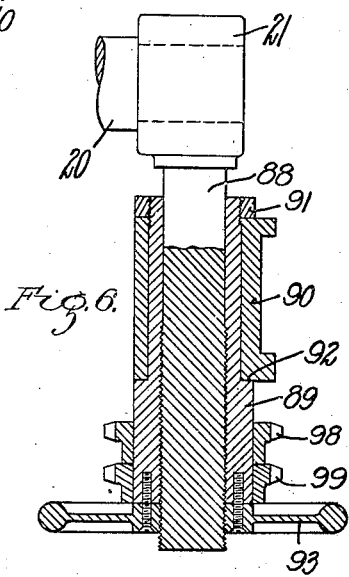
Inventor:
Frank J. MacDonald,
Charles L. Gooding,
Atty.

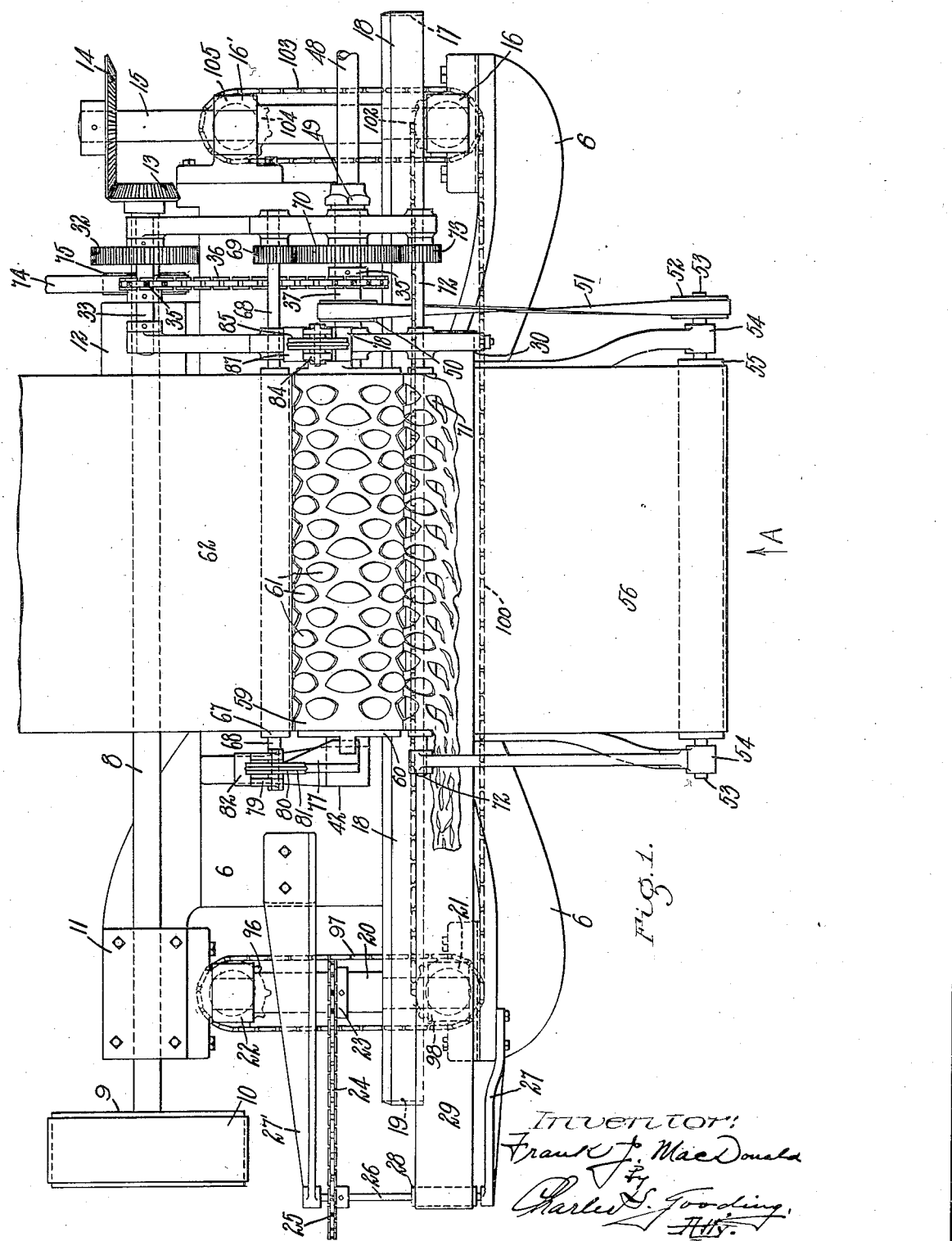

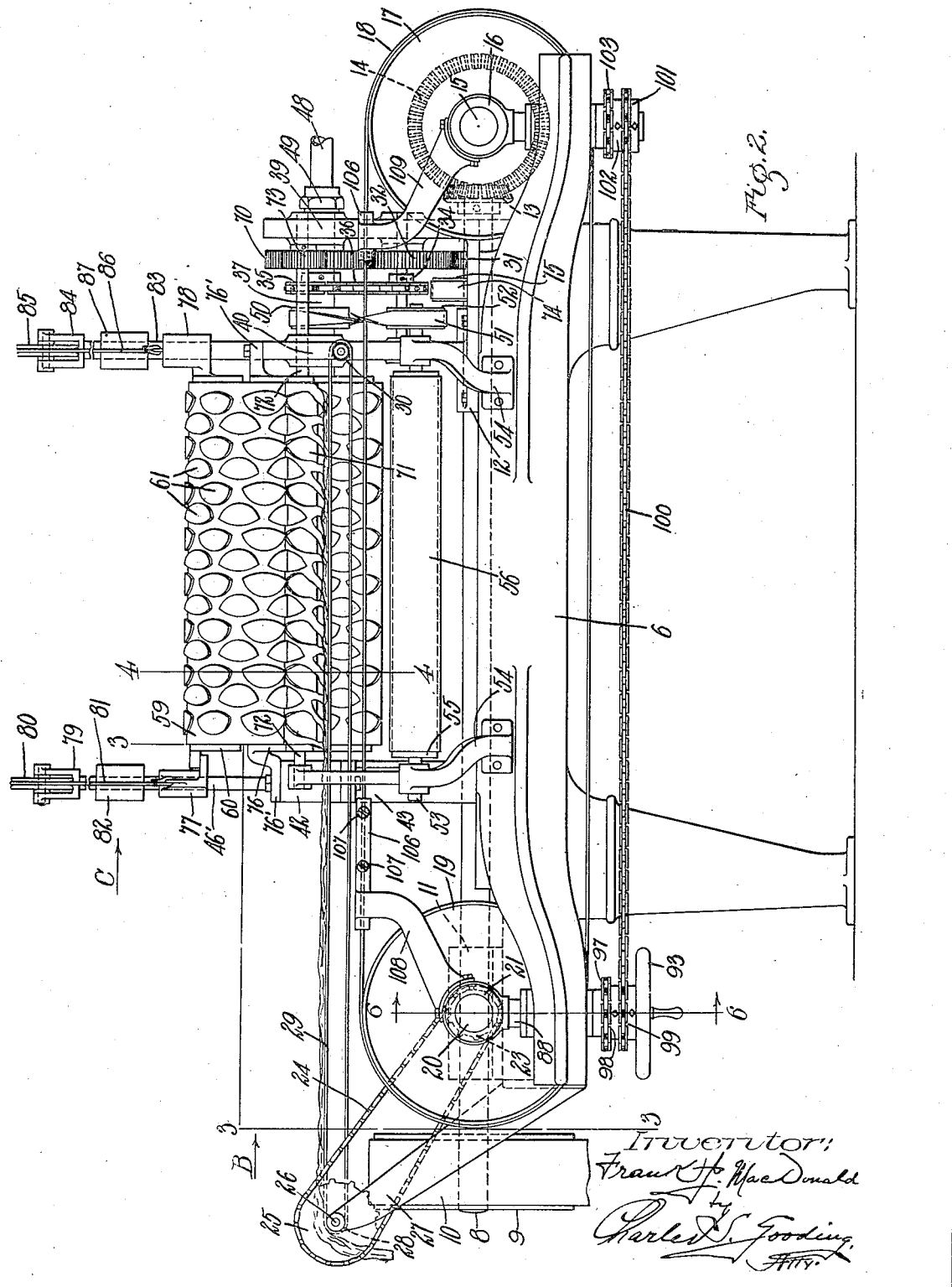

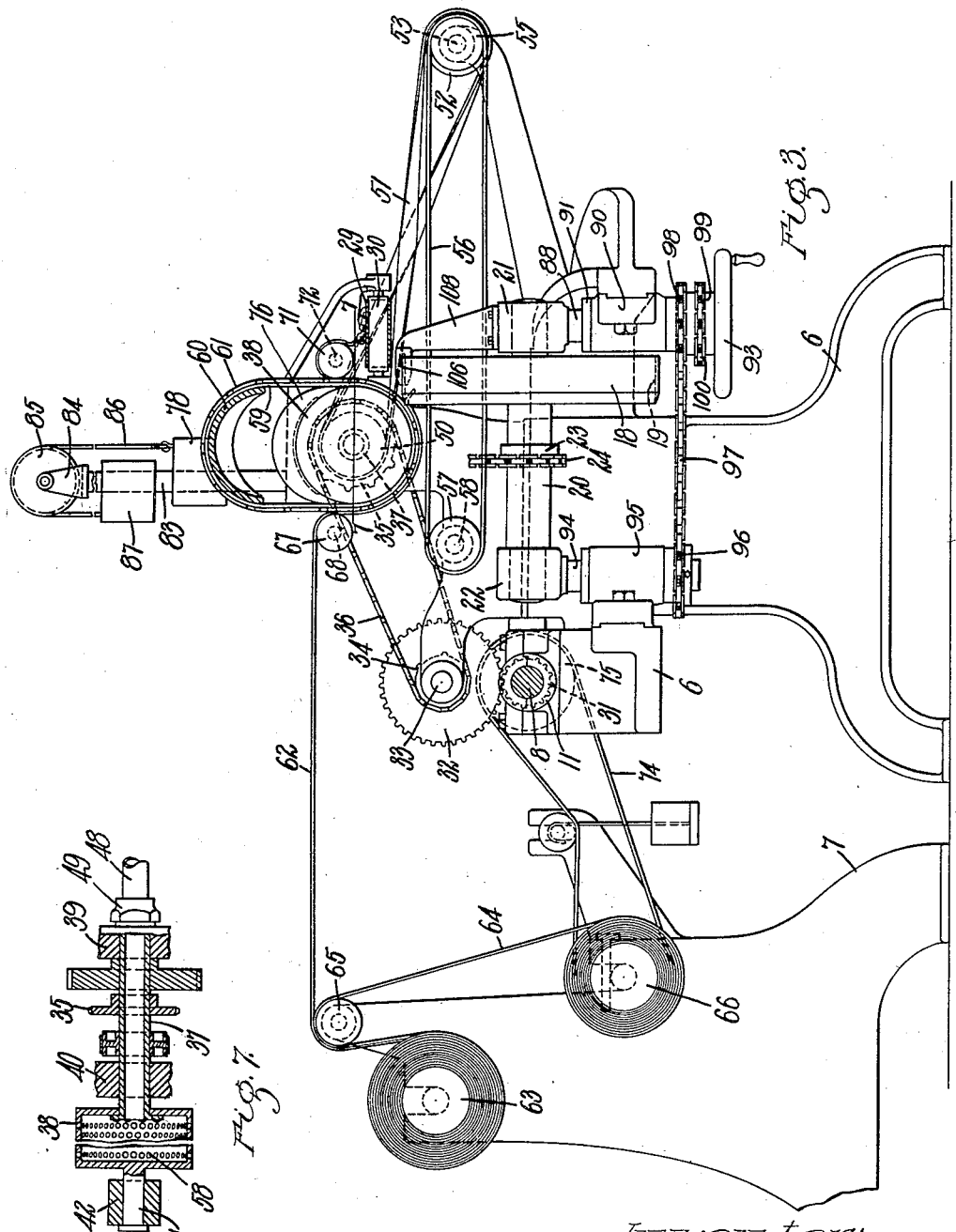

Patented Dec. 30, 1930

1,786,542

UNITED STATES PATENT OFFICE

FRANK J. MacDONALD, OF NEWTON, MASSACHUSETTS, ASSIGNOR, BY MESNE ASSIGNMENTS, TO HOOD RUBBER COMPANY, INC., OF WILMINGTON, DELAWARE, A CORPORATION OF DELAWARE

MACHINE FOR CUTTING ARTICLES FROM SHEET MATERIAL

Application filed September 17, 1928. Serial No. 306,308.

This invention relates to an improved machine for cutting articles from a sheet of material.

The object of the invention is to provide a machine whereby articles of different contours, length and/or width, may be automatically and rapidly cut from a sheet of material.

One embodiment of my invention is disclosed in the following specification and claims. It is to be understood, however, that the invention of this application is not restricted to the particular mechanism set forth in the specification, but consists of a machine as set forth in the appended claims, whereby portions of a sheet of material may be detruded and subsequently said portions cut from said sheet of material. The embodiment of my invention illustrated in the drawings is particularly adapted to be used in cutting articles of curvilinear outline, such as are employed in the manufacture of the uppers for rubber shoes, to wit, the vamp, quarter, cuff, etc.

The invention further consists in the combination and arrangement of parts set forth in the claims.

Referring to the drawings:

Figure 1 is a plan view of a cutting machine embodying my invention, certain parts being omitted for the sake of clearness in illustration.

Fig. 2 is a front elevation of the same as viewed in the direction of the arrow A, Fig. 1, the band knife guide being broken away for the sake of clearness in illustration.

Fig. 3 is a side elevation of the same partly in section on the line 3—3, Fig. 2, and viewed in the direction of the arrow B.

Fig. 4 is an enlarged sectional elevation taken on the line 4—4, Fig. 2.

Fig. 5 is a side elevation taken in the direction of the arrow C, Fig. 2, illustrating the means for supporting the drum, the shut-off and the belt tightener.

Fig. 6 is a sectional elevation taken on line 6—6, Fig. 2, illustrating one of the devices for adjusting the band knife and its guides toward and away from the drum.

Fig. 7 is a sectional plan taken on line 7—7, Fig. 3.

Like numerals refer to like parts in the several views of the drawings.

Figure 8:
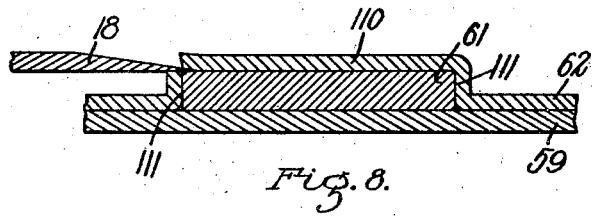
Fig. 8 is a sectional detail on an enlarged scale illustrating the knife cutting an article from the sheet material.
Figure 9:
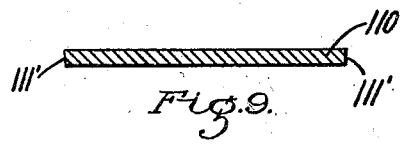
Fig. 9 is a sectional detail illustrating the article cut by the knife as in Fig. 8, after it has been severed from the sheet of material.

In the drawings, 6 and 7 are frames upon which the machine of this invention is supported. 8 is the main driving shaft, being driven by a pulley 9 and belt 10 and rotatably mounted in bearings 11 and 12 mounted on the frame 6. The shaft 8 has fastened to one end thereof a bevel gear 13 which meshes with a bevel gear 14, which is fastened to a shaft 15 rotatably mounted in a pair of bearings 16, 16'. The shaft 15 is fastened to a pulley 17 which drives an endless band knife 18. The band knife 18 passes from the pulley 17 to another pulley 19 which is fast to a shaft 20 rotatably mounted in bearings 21 and 22. The band knife 18 travels at a high rate of speed through an elongated guide 106 which is supported upon brackets 108 and 109 respectively, the said brackets being fastened to the bearings 21 and 16 respectively. The band knife 18 can be adjusted in its own plane by means of set screws 107 having screw-threaded engagement with the guide 106, see Fig. 4. The pulley 19 is an idler pulley driven by the band knife 18 and the shaft 20 has a sprocket gear 23 fast thereto which drives a sprocket chain 24 which, in turn, drives a sprocket gear 25. The sprocket gear 25 is fastened to a shaft 26 which is mounted in bearings on brackets 27, 27', fast to the frame 6, and to the shaft 26 is fastened a pulley 28 which drives an endless belt 29 for conveying waste material away from the cutter and drum. The endless belt 29 is supported and guided at the end thereof opposite the end which is supported and driven by the pulley 28 by a pulley 30, see Fig. 2.

The driving shaft 8 has fastened thereto a pinion 31 which meshes into a gear 32 fast to a shaft 33 rotatably mounted upon the frame 6 and having fastened thereto a sprocket gear 34 which drives a sprocket gear 35 by means of a sprocket chain 36. The sprocket gear 35 is fastened to a hollow shaft 37, (Fig. 7), which is rotated thereby and which has fastened thereto a drum 38. The shaft 37 is rotatably mounted in bearings 39 and 40 adjacent the right hand end of the drum 38 as viewed in Figs. 1, 2 and 7. The opposite end of said drum has a shaft 41 rotatably mounted in a bearing box 42 which is supported upon a bracket 43 and clamped thereto by a bolt 44. The bracket 43 is slotted at 45 and is rotatably mounted on a vertical shaft 46 which is mounted upon a bracket 47 fast to the frame 6 of the machine. The hollow shaft 37, see Fig. 7, as stated, is rotatably mounted in the bearing 39 and the bearing 39 has a pipe 48 fast thereto by a nut 49 in alignment with the hollow shaft 37, so that the shaft 37 has communication with the pipe 48 and the pipe 48 is connected to any suitable air pump, whereby the air may be exhausted from the interior of the drum 38 through the hollow shaft 37.

A pulley 50 is fastened to the shaft 37 and drives a cross belt 51, which drives a pulley 52 fast to a shaft 53 rotatably mounted upon brackets 54 which are fastened to the frame 6. A pulley 55 is fastened to the shaft 53 between the brackets 54 and drives a conveyer belt 56 which passes around an idler pulley 57 fast to a shaft 58 which is rotatably mounted upon the frame 6.

The conveyer belt 56 conveys the articles which have been cut out by the band knife away from the drum 38. The drum 38 is hollow and is provided upon its periphery with a plurality of orifices 158. A work-carrier or backing comprising an endless belt 59 extends partly around the under side of the drum 38 and passes upwardly therefrom in the direction of the arrow D, Fig. 4, over an adjustable belt tightener 60.

The belt 59 is made of material pervious to air and has fastened thereto templets 61 which are made of material impervious to air, such as, rubber compound. These templets are made of a contour like that of the article, or articles, which it is desired to cut from a sheet of material 62. The sheet of material 62 such, for example, as rubber compound, is wound upon a drum 63 with a sheet of fabric 64 interposed between the different layers of rubber sheet material 62, which are mounted upon the drum 63. The rubber and fabric pass to a drum 65 and there the fabric 64 passes downwardly and is wound upon another drum 66, while the rubber sheet material passes from the drum 65 to a drum 67 which is fastened to a shaft 68 rotatably mounted upon the frame of the machine and driven by a gear 69 which meshes into a gear 70 which is fastened to the shaft 37.

Another drum 71 is fastened to a shaft 72 rotatably mounted upon the frame of the machine and having a gear 73 fast thereto and meshing into the gear 70, and by this drum 71 waste material is conveyed from the drum 38 to the conveyer belt 29 by which the waste material is conveyed away from the drum 38. The fabric sheet 64 is wound upon the drum 66 by a belt 74 which rotates the drum 66 and is rotated by a pulley 75 fast to the shaft 8.

A shut-off member 76 rests upon the upper portion of the drum 38 and acts to close all of the orifices 158, which are included within said shut-off member. The shut-off member 76 is segmental in cross section as illustrated in Fig. 4 and is supported at its opposite ends by arms 76', see Figs. 2 and 5. The arm 76' at the right hand end of the shut-off member, Fig. 2, is supported upon an upward extension of the frame of the machine, and the arm 76' at the left hand end of the drum, Fig. 2, is supported upon the bearing block 42.

The belt tightener 60 is supported at its opposite ends upon brackets 77 and 78, Figs. 1, 2, 3, 5 and 7. The bracket 77, as particularly illustrated in Fig. 5, is mounted upon an upwardly extending portion 46' of the shaft 46. This portion 46' of said shaft is square in cross section and has a bracket 79 upon its upper end upon which is rotatably mounted a pulley 80 over which extends a rope 81, one end of which is fastened to the bracket 77 and the other is fastened to a counterweight 82 slidably mounted upon the shaft 46', so that the bracket 77 supports one end of the belt tightener 60, and the other end of the belt tightener 60 is supported by a bracket 78 integral therewith and slidably mounted on a vertical shaft 83 which projects upwardly from the frame of the machine and has a bracket 84 fast to its upper end upon which is rotatably mounted a pulley 85. A rope 86 extends over the pulley 85 and has fastened at one end thereof a counterweight 87, the other end of the rope being fastened to the bracket 78, whereby the belt tightener is held upwardly at its right hand end as viewed in Fig. 2.

In order to adjust the band knife 18 and its pulleys 17 and 19 vertically and therefore toward and away from the belt 59 and its templets 61 and relatively also to the drum 38, the bearings 16 and 16' of the shaft 15 to which the band knife pulley 17 is fastened and the bearings 21 and 22 of the shaft 20 to which the band knife pulley 19 is fastened, are adjustable vertically by means of the following mechanism:—Referring to Figs. 2 and 6, the bearing 21 has a vertical standard 88 fast thereto and extending downwardly into a sleeve 89 which is rotatably mounted in a bracket 90, see Figs. 3 and 6, which is fastened to the frame of the machine. The standard 88 has screw-threaded engagement with the sleeve 89, so that when the sleeve 89 is rotated, the standard 88, together with its bearing 21, will be moved upwardly or downwardly, the sleeve being held against movement longitudinally thereof by a collar 91 fast to the upper end of the sleeve and by a shoulder 92 on the sleeve 89 which bears against the under side of the bracket 90.

The sleeve 89 is manually rotated by means of a hand wheel 93 which is fastened thereto. Simultaneously with the vertical adjustment of the bearing 21 of the shaft 20, the bearing 22 is similarly adjusted by adjusting mechanism similar in every respect to that illustrated in Fig. 6 and embodying the bearing 22, see Fig. 3, a standard 94, a bracket 95 fastened to the frame 6 of the machine and a sprocket gear 96 which is rotated by a sprocket chain 97 driven by a sprocket gear 98 fast to the sleeve 89. The bearing 16 of the band pulley shaft 15 is likewise adjusted vertically by a sprocket gear 99 fast to the sleeve 89 and connected by a sprocket chain 100 to a sprocket gear 101, and in the same manner as hereinbefore described the rotation of the sprocket gear 101 causes the bearing 16 to be raised and lowered.

A sprocket gear 102 driven by the gear 101 is connected by a chain 103 to a sprocket gear 104, see Fig. 1, on a sleeve, not shown, which has screw-threaded connection with a standard 105 projecting downwardly from the bearing 16'. Thus it will be evident that upon rotating the hand wheel 93 the different bearings 16, 16', 21 and 22 will be raised or lowered together with the band pulley shafts 15 and 20. The different sprocket gears are attached to their respective sleeve by set screws, so that by loosening or tightening certain set screws any one of the bearings 16, 16', 21 and 22 may be adjusted vertically independent of the other bearings.

In the practical use of the machine it becomes necessary, on account of the variation in the sizes and lengths of the different pieces which it is desired to cut from the sheet of material, that different lengths of endless belts 59 should be employed. This necessitates removing the endless belt from the drum 38 and belt tightener 60. This can be accomplished by rotating the bracket 77 at right angles to the position illustrated in Fig. 5, thus rotating the shaft 46 and also rotating the pulley 80 and rope 81 and counterweight 82 through a like angle. This will remove the bracket 77 from alignment with the belt 59. The bracket 43 is also rendered rotatable upon the shaft 46 by loosening the bolt 44, thus allowing the bracket 43 to be turned at a right angle, as the bolt 44 extends through a slot 45 in the bracket 43. The belt 59 will thus be cleared of obstructions to its removal from the drum 38 and it is slipped off endwise of the drum toward the left of Fig. 2 and another belt substituted in its place, the brackets 77 and 43 then being returned to the relative positions illustrated in Fig. 5.

In Fig. 8 the knife 18 is illustrated as cutting an article 110 from a sheet of material 62 when the sheet of material is stretched over a templet 61 attached to the belt 59, the templet being formed with its edges 111 disposed at right angles to its face. The knife 18 is so adjusted as to just contact with the outer face of the templet 61. When the edges 111 are thus formed on the templet the edges 111' of the article 110 are disposed approximately at right angles to the face of the article 110 after the article has been cut from the sheet of material and has had time to regain its normal condition with the tension to which it was subjected while being cut removed therefrom.

Figure 10:
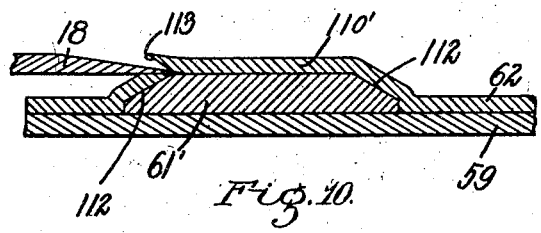
Fig. 10 is a sectional detail illustrating an article being cut from the sheet of material in a manner to provide a skived or beveled edge.
Figure 11:
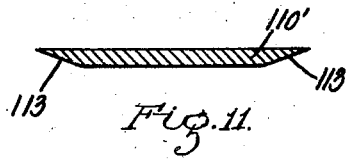
Fig. 11 is a detail section illustrating the article with a skived edge after it has been cut from the sheet of material.

In Fig. 10 the templet 61' is beveled at 112 and the cutter 18 under these conditions cuts the article 110' as illustrated in Fig. 10 along a line 113 and this line 113 forms in the completed and severed article beveled or skived edges when the article has been severed from the sheet material and allowed to regain its normal condition by being relieved of the tensional strain to which it is subjected while being cut.

Figure 12:
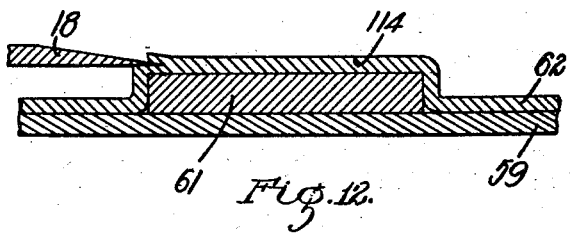
Fig. 12 is a sectional detail illustrating the article being cut from a sheet of material, the thickness of the article being less than the thickness of the sheet of material from which it is cut.

In Fig. 12 the cutter 18 is illustrated as cutting an article 114 from a sheet of material 62 which is supported upon the belt 59 and has templets 61 fast thereto as hereinbefore set forth. The knife 18 is now adjusted by means of the handle 93, Fig. 6, so that its cutting edge does not contact with the outer face of the templet 61 but is positioned so as to split that portion of the sheet material resting upon the templet 61 between its outer face and its inner face, thus producing an article 114 which is of less thickness than the thickness of the sheet material from which it is cut and leaving the sheet material 62 provided with a series of depressions of the same shape as the templets 61 which are attached thereto, but the material adjacent said depressions is of approximately one-half the original thickness of the material 62.

The general operation of the mechanism hereinbefore specifically described is as follows:—Assuming a belt 59 with templets 61 to be positioned in the machine, the templets being of the contour and number desired, the machine is started by means of the pulley 9 and belt 10 which rotate the band pulleys 17 and 19 and cause the band knife to travel at a high rate of speed through the guide 106. The mechanism hereinbefore described causes the drum 38 to be rotated in the direction of the arrow thereon in Fig. 4, thus driving the belt 59 and templets 61 in the direction of the arrow D, Fig. 4. The sheet of material 62 to be cut is fed by the drums 67 and 71, belt 59 and its templets 61 and the drum 38 around the lower half of said drum and certain portions of the sheet 62 are drawn toward the drum or detruded so as to cause all that portion of the rubber sheet which does not rest upon the templets 61 to enter the recessed portions between and surrounding the templets 61. This leaves certain portions of the sheet of rubber projecting beyond other portions, these projecting portions constituting the articles 110 which are cut from the sheet, see Fig. 4. The portions 110 are cut from the sheet 62 by the endless band knife 18 as illustrated in Fig. 4 and these portions or articles are conveyed away from the drum by the belt 56, while the waste material passes from the drum 71 to the endless belt 29.

It is understood that the air is drawn from the interior of the drum 38 during this operation, through the suction pipe 48 and hollow shaft 37, the partial vacuum thus caused in the drum causing the sheet of rubber 62 to be pressed downwardly with force, or detruded into the spaces surrounding the templets 61 and against the pervious belt 59.

I claim:

1. A cutting machine having, in combination, a carrier for sheet material provided with recesses, mechanism to move said carrier, means to force portions of said sheet material into said recesses, and a knife so positioned adjacent to said carrier as to sever the sheet material in said recesses from the remainder of said sheet material.

2. A cutting machine having, in combination, a carrier for sheet material provided with recesses, mechanism to move said carrier, means to force portions of said sheet material into said recesses, a band knife so positioned adjacent to said carrier as to sever the sheet material in said recesses from the remainder of said sheet material, and means to receive the severed portions of said sheet material originally located in said recesses.

3. A cutting machine having, in combination, a carrier for sheet material provided with recesses, mechanism to move said carrier, means to force portions of said sheet material into said recesses, a band knife so positioned adjacent to said carrier as to sever the sheet material in said recesses from the remainder of said sheet material, and means to receive the severed portions of sheet material originally located outside said recesses.

4. A cutting machine having, in combination, a carrier for sheet material provided with recesses, mechanism to move said carrier, means to force portions of said sheet material into said recesses, a band knife so positioned adjacent to said carrier as to sever the sheet material in said recesses from the remainder of said sheet material, and means to receive the severed portions of said sheet material originally located in said recesses, said means comprising a conveyor belt.

5. A cutting machine having, in combination, a carrier for sheet material provided with recesses, mechanism to move said carrier, means to force portions of said sheet material into said recesses, a band knife so positioned adjacent to said carrier as to sever the sheet material in said recesses from the remainder of said sheet material, and means to receive the severed portions of sheet material originally located outside said recesses, said means comprising a conveyor belt.

6. A cutting machine having, in combination, a carrier for sheet material provided with recesses, mechanism to move said carrier in a curvilinear path, means to force portions of said sheet material into said recesses, and a band knife so positioned adjacent to said carrier as to sever the sheet material in said recesses from the remainder of said sheet material.

7. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum, whereby portions of a sheet of material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material.

8. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum, whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to receive the portions of said sheet material originally located between said recesses.

9. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to receive the portions of said sheet material originally contacting with said templets.

10. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum, whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to receive the portions of said sheet material originally located between said recesses, said means comprising a conveyor belt.

11. A cutting machine having, in combination, a hollow rotary drum provided with orifices in its periphery, means to rotate said drum, an endless belt extending partly around said drum and pervious to air, templets on the outer face of said belt, means to exhaust air from the interior of said drum, whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to receive the portions of said sheet material originally contacting with said templets, said means comprising a conveyor belt.

12. A cutting machine having, in combination, a hollow rotary drum provided with orifices in its periphery, means to rotate said drum, an endless belt extending partly around said drum and pervious to air, means to tighten said belt, templets on the outer face of said belt, means to exhaust the air from the interior of said drum, whereby portions of a sheet of material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material.

13. A cutting machine having, in combination, a hollow rotary drum provided with orifices in its periphery, means to rotate said drum, an endless belt extending partly around said drum and pervious to air, a shut-off member covering the orifices in said drum which are not engaged by said belt, templets on the outer face of said belt, means to exhaust the air from the interior of said drum, whereby portions of a sheet of material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material.

14. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum, whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to adjust said band knife laterally thereof relatively to said drum.

15. A cutting machine having, in combination, a hollow rotary drum provided with orifices in its periphery, means to rotate said drum, an endless belt extending partly around said drum and pervious to air, templets on the outer face of said belt, means to exhaust the air from the interior of said drum, whereby portions of a sheet of material positioned on said belt will be drawn into the recesses between said templets, a band knife adjacent said belt and extending thereacross, its cutting edge in juxtaposition with the outer faces of said templets, whereby the portions of said sheet material contacting with the outer faces of the templets may be severed from the remainder of said sheet material, and means to adjust said band knife transversely thereof relatively to said drum.

16. A cutting machine having, in combination, a hollow rotary drum provided with orifices in its periphery, means to rotate said drum, an endless belt extending partly around said drum and pervious to air, templets on the outer face of said belt, means to guide sheet material to the outer face of that portion of said belt which contacts with said drum, means to exhaust the air from the interior of said drum, whereby portions of a sheet of material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material.

17. A cutting machine having, in combination, a hollow rotary drum provided with orifices in its periphery, means to rotate said drum, an endless belt extending partly around said drum and pervious to air, means to tighten said belt, templets on the outer face of said belt, their edges being approximately perpendicular to their opposite faces, means to exhaust the air from the interior of said drum, whereby portions of a sheet of elastic material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material, the edges of the portions of sheet material so severed being positioned approximately at right angles to its opposite faces when released from tension.

18. A cutting machine having, in combination, a hollow rotary drum provided with orifices in its periphery, means to rotate said drum, an endless belt extending partly around said drum and pervious to air, means to tighten said belt, templets on the outer face of said belt, their edges being inclined to their faces, means to exhaust the air from the interior of said drum, whereby portions of a sheet of elastic material positioned on said belt will be drawn into the recesses between said templets, and a band knife adjacent said belt and extending thereacross, its cutting edge in juxtaposition with the outer faces of said templets, whereby the portions of said sheet material contacting with the outer faces of the templets may be severed from the remainder of said sheet material with the edges of said portions of sheet material so severed being inclined to the opposite faces thereof when released from tension.

19. A cutting machine having, in combination, a hollow rotary drum provided with orifices in its periphery, means to rotate said drum, an endless belt extending partly around said drum and pervious to air, means to tighten said belt, templets on the outer face of said belt, their edges being approximately perpendicular to their opposite faces, means to exhaust the air from the interior of said drum, whereby portions of a sheet of elastic material positioned on said belt will be drawn into the recesses between said templets, and a band knife adjacent said belt and extending thereacross, its cutting edge spaced apart from the outer faces of said templets whereby portions of said sheet material of a contour approximately like that of said templets and of a thickness less than that of said sheet material may be severed from the remainder of said sheet material.

20. A cutting machine having, in combination, a carrier of sheet material pervious to air, templets thereon of material impervious to air and spaced apart, a support for said carrier, suction means adapted to force sheet material to be cut, superimposed on said carrier, into the spaces between said templets, and a cutter positioned adjacent said carrier and adapted to sever portions of the sheet material to be cut and contacting with the outer faces of the templets, from the remainder of said sheet material.

21. A cutting machine having, in combination, a carrier of sheet material pervious to air, templets thereon of flexible material impervious to air and spaced apart, a support for said carrier, suction means adapted to force sheet material to be cut, superimposed on said carrier, into the spaces between said templets, and a cutter positioned adjacent said carrier and adapted to sever portions of the sheet material to be cut and contacting with the outer faces of the templets, from the remainder of said sheet material.

22. A cutting machine having, in combination, a carrier of sheet material pervious to air, rubber templets thereon and spaced apart, a support for said carrier, suction means adapted to force sheet material to be cut, superimposed on said carrier, into the spaces between said templets, and a cutter positioned adjacent said carrier and adapted to sever portions of the sheet material to be cut and contacting with the outer faces of the templets, from the remainder of said sheet material.

23. A cutting machine having, in combination, a carrier of sheet material pervious to air, templets thereon of material impervious to air and spaced apart, a support for said carrier, suction means adapted to force sheet material to be cut, superimposed on said carrier, into the spaces between said templets, and a cutter positioned adjacent said carrier, its cutting edge spaced apart from the outer faces of said templets and adapted to sever portions of said sheet material to be cut, of a contour approximately like that of said templets and of a thickness less than that of said sheet material from the sheet material to be cut.

24. A cutting machine having, in combination, a carrier of sheet material pervious to air, templets thereon of material impervious to air and spaced apart, a support for said carrier, suction means adapted to force sheet material to be cut, superimposed on said carrier, into the spaces between said templets, and a band knife positioned adjacent said carrier and adapted to sever portions of the sheet material to be cut and contacting with the outer faces of the templets, from the remainder of said sheet material.

25. A cutting machine having, in combination, a carrier of sheet material pervious to air, means to impart motion to said carrier, templets on said carrier of material impervious to air and spaced apart, a support for said carrier, suction means adapted to force sheet material to be cut, superimposed on said carrier, into the spaces between said templets, and a cutter positioned adjacent said carrier and adapted to sever portions of the sheet material to be cut and contacting with the outer faces of the templets, from the remainder of said sheet material.

26. In a machine of the character described, the combination of a backing for flexible sheet material, said backing having a recess therein, means for forcing a portion of the sheet into said recess by differential fluid pressure applied to opposite faces of the sheet, a knife, and means for effecting relative movement of the knife and backing whereby the sheet material in the recess is severed from the remainder of the sheet.

27. A combination as defined in claim 26 in which the backing comprises pervious material.

28. In a machine of the character described, the combination of a backing for flexible sheet material, said backing having a portion raised above contiguous portions thereof, means for forcing the sheet material into close contact with the backing upon and adjacent to the raised portion by differential fluid pressure applied to opposite faces of the sheet, a knife, and means for effecting relative movement of the knife and backing whereby at least a portion of the sheet material lying upon said raised portion is severed from the remainder of the sheet.

In testimony whereof I have hereunto set my hand.

FRANK J. MacDONALD.